(12) United States Patent
Maki

(10) Patent No.: US 10,695,878 B2
(45) Date of Patent: Jun. 30, 2020

(54) TOOL CHANGE ROTARY POSITION DETERMINING DEVICE AND TOOL CHANGE ROTARY POSITION DETERMINING METHOD

(71) Applicant: FANUC CORPORATION, Yamanashi (JP)

(72) Inventor: Susumu Maki, Yamanashi-ken (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/043,690

(22) Filed: Jul. 24, 2018

(65) Prior Publication Data

US 2019/0030668 A1 Jan. 31, 2019

(30) Foreign Application Priority Data

Jul. 25, 2017 (JP) .................................. 2017-143709

(51) Int. Cl.
*B23Q 3/157* (2006.01)
*B23Q 3/155* (2006.01)
(Continued)

(52) U.S. Cl.
CPC .......... *B23Q 3/15534* (2016.11); *B23Q 17/00* (2013.01); *G05B 19/402* (2013.01);
(Continued)

(58) Field of Classification Search
CPC ....................... B23Q 3/15503; B23Q 3/15526; B23Q 3/157; B23Q 3/15706; B23Q 16/02; B23Q 3/15534
(Continued)

(56) References Cited

U.S. PATENT DOCUMENTS 5,435,067 A * 7/1995 Uchida .................. B23Q 16/02
33/1 N
7,445,587 B2 * 11/2008 Kojima .............. B23Q 3/15706
483/56
(Continued)

FOREIGN PATENT DOCUMENTS

CN 102729083 A 10/2012
CN 104416400 A 3/2015
(Continued)

OTHER PUBLICATIONS

EPO Machine Translation of JP2011173197—Watanabe, Masateru; "Numerically-Controlled Machine Tool"; Year: Sep. 8, 2011.*
(Continued)

*Primary Examiner* — Erica E Cadugan
*Assistant Examiner* — Michael Vitale
(74) *Attorney, Agent, or Firm* — Fredrikson & Byron, P.A.

(57) ABSTRACT

A tool change rotary position determining device includes: a turret rotation controller configured to control a turning motor so as to turn a turret clockwise and counterclockwise in a state where a tool holder of a tool gripped by a specific grip on the turret is inserted in an attachment hole of a spindle; and a tool change rotary position determining unit configured to determine a tool change rotary position of the turret when the tool is transferred between the specific grip and the spindle to be attached to and removed from the spindle, based on the load torques and the rotary positions of the turning motor when the turret is turned clockwise and counterclockwise.

7 Claims, 8 Drawing Sheets

(51) Int. Cl.
*B23Q 17/00* (2006.01)
*G05B 19/402* (2006.01)

(52) U.S. Cl.
CPC ...... *B23Q 3/15706* (2013.01); *B23Q 3/15722* (2016.11); *Y10T 483/12* (2015.01); *Y10T 483/1795* (2015.01); *Y10T 483/1873* (2015.01)

(58) Field of Classification Search
USPC .............................. 483/4–13, 54–57, 66, 67
See application file for complete search history.

(56) References Cited

U.S. PATENT DOCUMENTS

| | | | |
|---|---|---|---|
| 10,384,320 B2 * | 8/2019 | Inaguchi ............ | B23Q 3/15534 |
| 2013/0331245 A1 * | 12/2013 | Koike ................ | B23Q 3/15526 483/54 |
| 2017/0087678 A1 * | 3/2017 | Isobe ................. | B23Q 3/15706 |
| 2017/0203371 A1 | 7/2017 | Yoshida et al. | |

FOREIGN PATENT DOCUMENTS

| CN | 104416402 A | 3/2015 |
|---|---|---|
| CN | 204195360 U | 3/2015 |
| CN | 204397453 U | 6/2015 |
| JP | 2011173197 A | 9/2011 |
| JP | 20159304 A | 1/2015 |
| JP | 201549540 A | 3/2015 |
| JP | 201596280 A | 5/2015 |
| JP | 2017159381 A | 9/2017 |
| JP | 201839068 A | 3/2018 |
| KR | 1020130009433 A | 1/2013 |

OTHER PUBLICATIONS

English Abstract and Machine Translation for Japanese Publication No. 2015-096280 A, published May 21, 2015, 16 pgs.
English Abstract and Machine Translation for Japanese Publication No. 2015-049540 A, published Mar. 16, 2015, 19 pgs.
English Abstract and Machine Translation for Japanese Publication No. 2015-009304 A, published Jan. 19, 2015, 13 pgs.
English Abstract and Machine Translation for Japanese Publication No. 2018-039068 A, published Mar. 15, 2018, 17 pgs.
English Abstract and Machine Translation for Japanese Publication No. 2017-159381 A, published Sep. 14, 2017, 12 pgs.
English Abstract and Machine Translation for Korean Publication No. 20130009433 A, published Jan. 23, 2013, 14 pgs.
English Abstract and Machine Translation for Japanese Publication No. 2011-173197 A, published Sep. 8, 2011, 14 pgs.
English Abstract and Machine Translation for Chinese Publication No. 104416402 A, published Mar. 18, 2015, 15 pgs.
English Abstract and Machine Translation for Chinese Publication No. 104416400 A, published Mar. 18, 2015, 15 pgs.
English Abstract and Machine Translation for Chinese Publication No. 204397453 U, published Jun. 17, 2015, 17 pgs.
English Abstract and Machine Translation for Chinese Publication No. 204195360 U, published Mar. 11, 2015, 9 pgs.
English Abstract and Machine Translation for Chinese Publication No. 102729083 A, published Oct. 17, 2012, 14 pgs.

* cited by examiner

TOOL CHANGE ROTARY POSITION DETERMINING DEVICE AND TOOL CHANGE ROTARY POSITION DETERMINING METHOD

CROSS-REFERENCE TO RELATED APPLICATION

This application is based upon and claims the benefit of priority from Japanese Patent Application No. 2017-143709 filed on Jul. 25, 2017, the contents of which are incorporated herein by reference.

BACKGROUND OF THE INVENTION

Field of the Invention

The present invention relates to a tool change rotary position determining device and a tool change rotary position determining method for determining a tool change rotary position of a turret when a tool is transferred between a grip of the turret and a spindle to be attached to and removed from the spindle.

Description of the Related Art

Japanese Laid-Open Patent Publication No. 2011-173197 discloses a numerically controlled machine tool that can correct a positional deviation or a positional error of a tool changer. Briefly explaining, when the spindle head is moved in the Z-axis direction, the value of current in the magazine motor for rotating the turret is used to determine and correct a positional deviation.

SUMMARY OF THE INVENTION

However, the configuration disclosed in Japanese Laid-Open Patent Publication No. 2011-173197 cannot detect a positional deviation unless it is a distinct one. In addition, when the tools are distributed on the turret unevenly or in an imbalanced manner, the current value fluctuates depending on the rotation angle of the turret, so that it is impossible to perform accurate adjustment.

It is therefore an object of the present invention to provide a tool change rotary position determining device and a tool change rotary position determining method capable of accurately determining a tool change rotary position of a turret when a tool is transferred between a grip of the turret and a spindle so as to be attached to and removed from the spindle.

According to a first aspect of the present invention, a tool change rotary position determining device for use with a machine tool, the machine tool including: a revolving turret including a plurality of grips arranged along a circumferential direction thereof, each capable of holding a tool to be attached to an attachment hole of a spindle via a tool holder; and a turning motor configured to turn the turret, the tool change rotary position determining device determining a tool change rotary position of the turret when the machine tool transfers the tool between the grip and the spindle to attach the tool to or remove the tool from the spindle, the device comprises: a load torque acquisition unit configured to acquire a load torque on the turning motor; a rotary position acquisition unit configured to acquire a rotary position of the turning motor; a turret rotation controller configured to control the turning motor so as to turn the turret clockwise and counterclockwise in a state where the tool holder of the tool gripped by a specific grip among the plurality of grips is inserted in the attachment hole of the spindle; and a tool change rotary position determining unit configured to determine the tool change rotary position of the turret when the tool is transferred between the specific grip and the spindle to be attached to and removed from the spindle, based on the load torques acquired by the load torque acquisition unit and the rotary positions acquired by the rotary position acquisition unit when the turret is turned clockwise and counterclockwise.

According to a second aspect of the present invention, a tool change rotary position determining method for use with a machine tool, the machine tool including: a revolving turret including a plurality of grips arranged along a circumferential direction thereof, each capable of holding a tool to be attached to an attachment hole of a spindle via a tool holder; and a turning motor for turning the turret, the tool change rotary position determining method determining a tool change rotary position of the turret when the machine tool transfers the tool between the grip and the spindle to attach the tool to or remove the tool from the spindle, the method comprises: a load torque acquiring step of acquiring a load torque on the turning motor; a rotary position acquiring step of acquiring a rotary position of the turning motor; and a turret rotation controlling step of controlling the turning motor so as to turn the turret clockwise and counterclockwise in a state where the tool holder of the tool gripped by a specific grip among the plurality of grips is inserted in the attachment hole of the spindle; and a tool change rotary position determining step of determining a tool change rotary position of the turret when the tool is transferred between the specific grip and the spindle to be attached to and removed from the spindle, based on the load torques acquired at the load torque acquiring step and the rotary positions acquired at the rotary position acquiring step when the turret is turned clockwise and counterclockwise.

According to the present invention, it is possible to accurately and easily determine the tool change rotary position of the turret when the tool is transferred between the turret and the spindle to be attached to and removed from the spindle. Therefore, when the tool is arranged in the turret unevenly, even if a positional deviation occurs due to manufacturing error, attachment error, etc. of the turret, the spindle or the like, it is possible to accurately and easily determine the tool change rotary position of the turret without causing misalignment between the spindle and the grip.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The tool change rotary position determining device and the tool change rotary position determining method according to the present invention will be detailed hereinbelow by describing preferred embodiment with reference to the accompanying drawings.

First Embodiment

Figure 1:
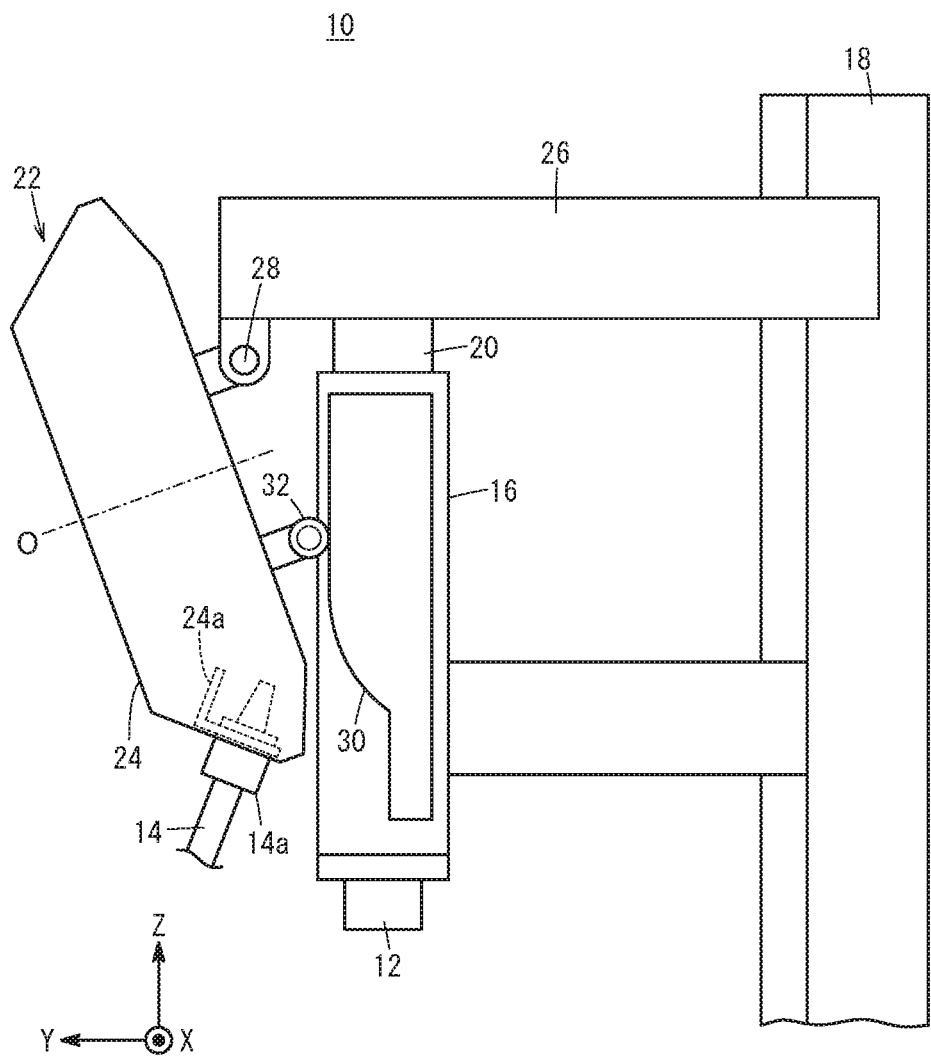
FIG. 1 is a partial configuration diagram of a machine tool.

FIG. 1 is a partial configuration diagram of a machine tool 10. The machine tool 10 machines an unillustrated object to be machined (workpiece) with a tool (cutting tool) 14 attached to a spindle 12. Examples of the tool 14 may include spring-necked turning tools, drills, end mills, milling cutters and the like.

The machine tool 10 includes the spindle 12, a spindle head 16 for rotating the spindle 12 about a rotation axis (Z-axis) parallel to the Z-direction and a column 18 standing upward (positive Z-direction) on an unillustrated base to guide the motion of the spindle head 16 in the Z-axis direction (vertical direction). Here, the gravity acts in the negative Z-direction.

Arranged above the spindle head 16 is a spindle motor 20 for rotating the spindle 12. The tool 14 can be attached to and removed from the spindle 12. The tool 14 is held by a tool holder 14a and detachably attached to the spindle 12 via the tool holder 14a. The tool 14 is attached to the spindle 12 by inserting the tool holder 14a into an attachment hole 12a (see FIG. 5) formed at the tip of the spindle 12. The tool 14 rotates together with the spindle 12.

A table (not shown) for supporting the workpiece is provided under the spindle head 16 (in the negative Z-direction). This table is movable in the X-direction and the Y-direction. Due to the movement of the spindle head 16 in the Z-direction and the movement of the table in the X-direction and the Y-direction, the machine tool 10 can machine the workpiece in three dimensions. Here, the X-direction, the Y-direction and the Z-direction are ideally orthogonal to each other.

Figure 2:
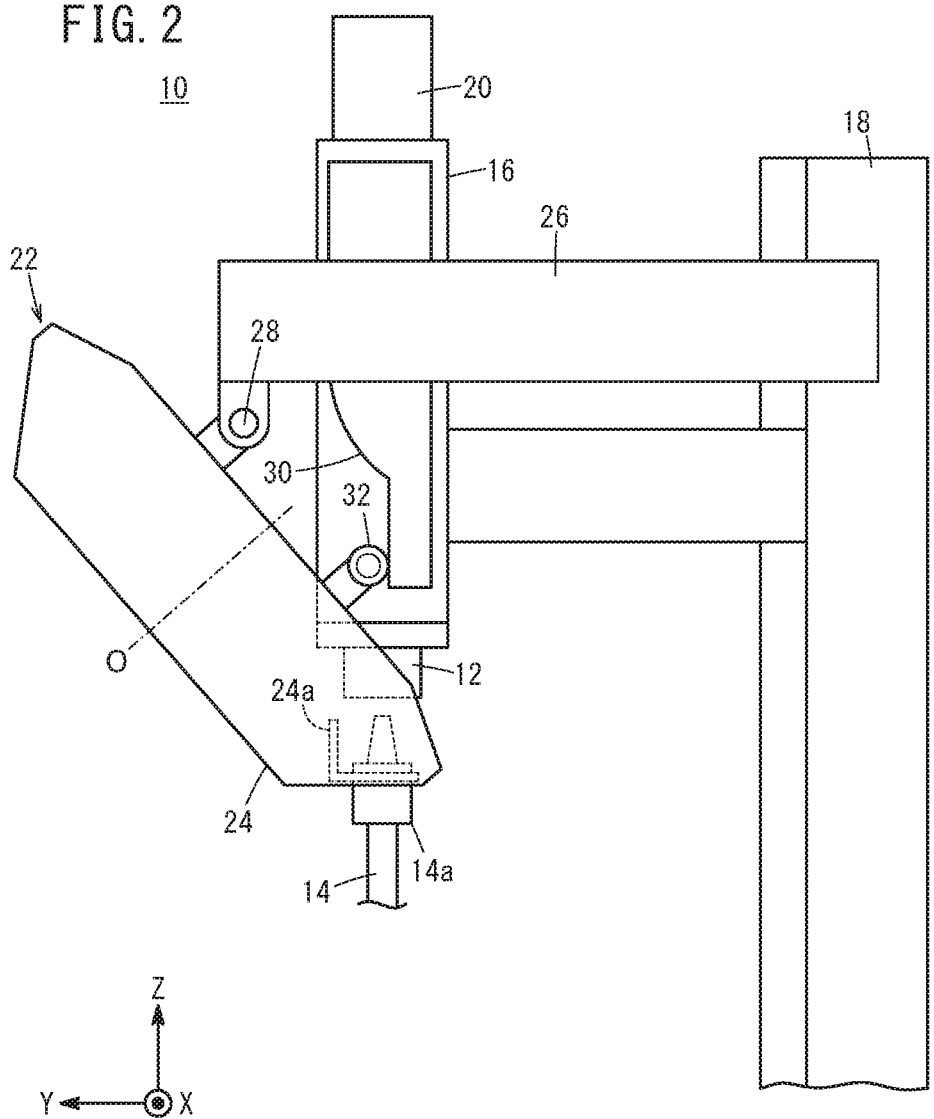
FIG. 2 is a diagram showing a state in which the spindle head has been moved in the positive Z-direction to swing the turret until it reaches a tool change position in order to attach the tool held by the grip to the spindle.

The machine tool 10 includes an automatic tool changer 22 for automatically changing the tools 14 to be attached to the spindle 12. The automatic tool changer 22 has a revolving turret (magazine) 24. The turret 24 rotates about a rotation axis O. The turret 24 has a plurality of grips 24a arranged along the circumferential direction. Each of the multiple grips 24a detachably holds a tool 14 via the tool holder 14a. In FIG. 1 and FIG. 2, for simplicity, only the grip 24a that holds the tool 14 located at the tool change position (for example, the lowermost position) is shown.

The turret 24 is supported by a pair of support members 26 extending in the positive Y-direction from the column 18. The turret 24 is supported so as to be able to swing (rotate) by a swing shaft (pivot shaft) 28 arranged at the distal ends of the paired support members 26. The spindle head 16 and the spindle motor 20 are arranged between the pair of support members 26.

A cam 30 is provided on a side surface of the spindle head 16, whereas a cam follower 32 in contact with the cam 30 is provided on the turret 24. As the spindle head 16 moves in the Z-direction relative to the column 18, the cam follower 32 moves on the cam 30 along the shape thereof. As a result, the turret 24 swings (turns) about the swing shaft 28. The cam 30 and the cam follower 32 form a cam mechanism.

In the state shown in FIG. 1, when the spindle head 16 goes up (moves in the positive Z-direction), the turret 24, thanks to the cam mechanism, swings toward the spindle head 16 about the swing shaft 28, to take a state shown in FIG. 2 tool change state). As a result, the tool 14 set at the tool change position is positioned under the spindle 12. In this state, the tool 14 set at the tool change position will not interfere with the spindle 12. Here, FIG. 2 is a diagram showing a state in which the spindle head 16 has been moved in the positive Z-direction to swing the turret 24 until it reaches the tool change position in order to attach the tool 14 held by the grip 24a to the spindle 12.

Figure 3:
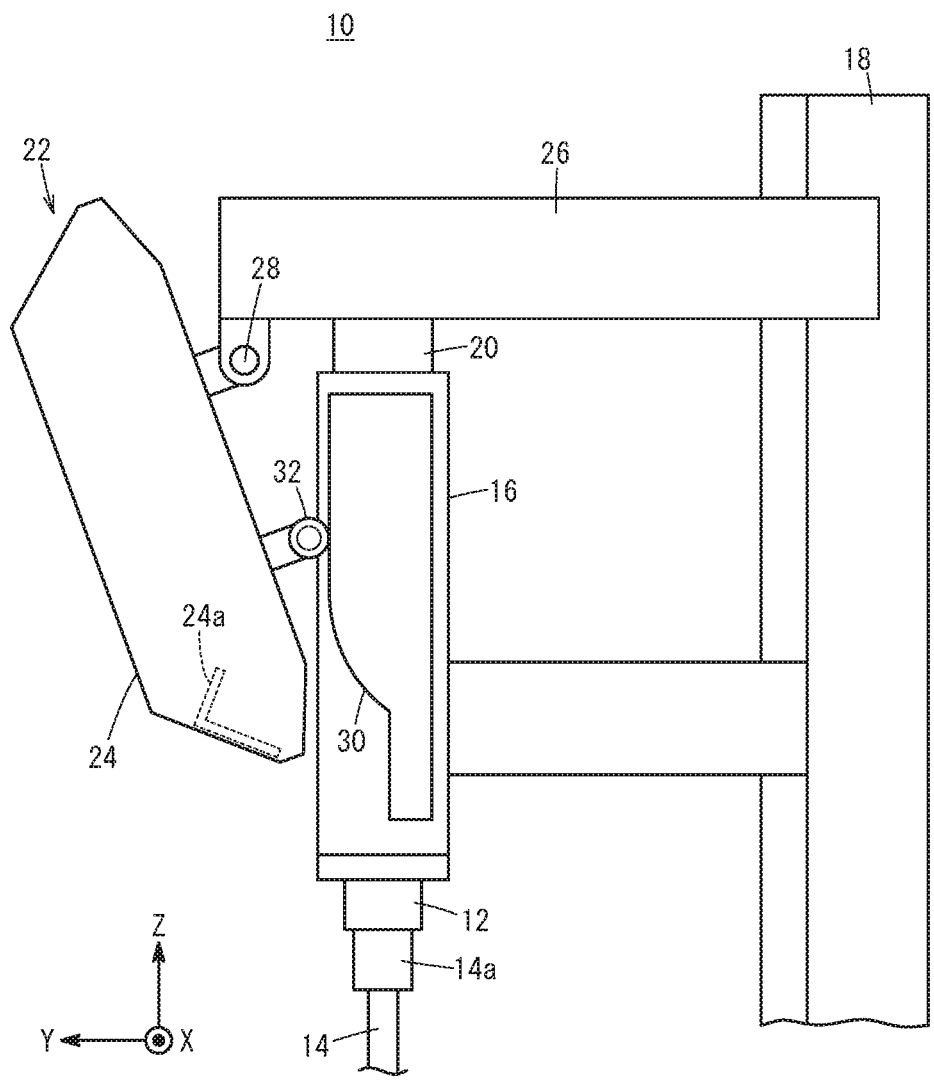
FIG. 3 is a diagram showing a state in which the spindle head has been moved in the negative Z-direction so that the tool held by the grip is attached to the spindle.

In the state shown in FIG. 2, when the spindle head 16 goes down (moves in the negative Z-direction), the tool 14 located at the tool change position is mounted to the spindle 12 while the turret 24, thanks to the cam mechanism, swings about the swing shaft 28 away from the spindle head 16, to take a state shown in FIG. 3. That is, the attitude of the turret 24 returns to the state shown in FIG. 1 (non-tool change position). The tool 14 is inserted into the attachment hole 12a of the spindle 12 and attached to the spindle 12. Here, FIG. 3 is a diagram showing a state in which the spindle head 16 has been moved in the negative Z-direction so that the tool 14 held by the grip 24a is attached to the spindle 12.

In this way, the tool 14 held by the grip 24a of the turret 24 can be attached to the spindle 12. Likewise, removal of the tool 14 attached to the spindle 12 can be done in a similar manner. Thus, the tool 14 attached to the spindle 12 is caught by the grip 24a of the turret 24 and removed.

Figure 4:
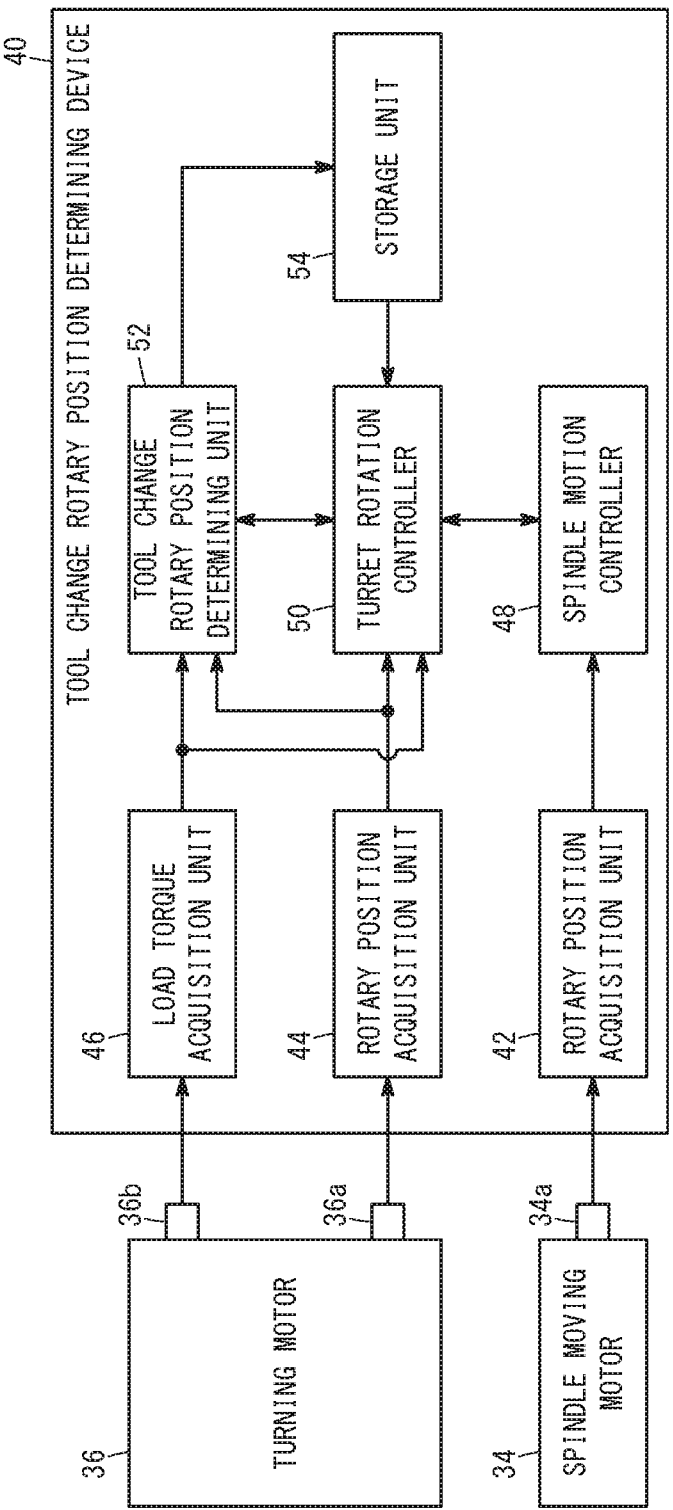
FIG. 4 is a functional block diagram showing a configuration of a tool change rotary position determining device.

FIG. 4 is a functional block diagram showing a configuration of a tool change rotary position determining device 40. Reference numeral 34 designates a spindle moving motor (e.g., a servomotor) provided in the machine tool 10, and reference numeral 36 denotes a turning motor (e.g., a servomotor).

The spindle moving motor 34 is a motor for moving the spindle head 16 (the spindle 12) in the Z-axis direction relative to the column 18. The spindle moving motor 34 is provided with a rotary position detector 34a that detects the rotary position of the spindle moving motor 34. The rotary position detector 34a may directly detect the rotary position or may detect information indicating the rotary position.

The turning motor 36 is a motor for rotating the turret 24 about the rotation axis O. The turning motor 36 is provided with a rotary position detector 36a for detecting the rotary position of the turning motor 36 and a load torque detector 36b for detecting the load torque on the turning motor 36. The rotary position detector 36a may directly detect the rotary position of the turning motor 36 or may detect information indicating the rotary position. The load torque detector 36b may directly detect the load torque on the turning motor 36 or may detect information indicating the load torque (the current flowing through the turning motor 36, etc.).

The tool change rotary position determining device 40 determines the tool change rotary position of the turret 24 when the tool 14 is transferred between the grip 24a and the spindle 12 to be attached to and removed from the spindle 12. The tool change rotary position determining device 40 controls the spindle moving motor 34 and the turning motor 36 to determine the tool change rotary position. The tool change rotary position of the turret 24 is the rotary position from a reference rotary position (for example, the origin position) of the turret 24.

The detection signals detected by the rotary position detectors 34a, 36a are used for feedback control of the spindle moving motor 34 and the turning motor 36, respectively.

The tool change rotary position determining device 40 is a computer having a processor such as a CPU, a memory and the like, and the processor runs a program stored in the memory to function as the tool change rotary position determining device 40 of the present embodiment. Though not illustrated, the tool change rotary position determining device 40 includes a mouse, keyboard and other input devices that accept operator's control and a display unit that displays information to the operator. The tool change rotary position determining device 40 may be a control device that controls the machine tool 10 to perform machining or a separate controller other than the aforementioned control device that controls the machine tool 10.

The tool change rotary position determining device 40 includes rotary position acquisition units 42, 44, a load torque acquisition unit 46, a spindle motion controller 48, a turret rotation controller 50, a tool change rotary position determining unit 52 and a storage unit 54.

The rotary position acquisition unit 42 acquires the rotary position of the spindle moving motor 34 based on the detection signal from the rotary position detector 34a. The rotary position acquisition unit 42 outputs the acquired rotary position of the spindle moving motor 34 to the spindle motion controller 48.

The rotary position acquisition unit 44, based on the detection signal from the rotary position detector 36a, acquires the rotary position of the turning motor 36. The rotary position acquisition unit 44 outputs the obtained rotary position of the turning motor 36 to the turret rotation controller 50 and the tool change rotary position determining unit 52.

The load torque acquisition unit 46, based on the detection signal from the load torque detector 36b, acquires the load torque on the turning motor 36. The load torque acquisition unit 46 outputs the acquired load torque on the turning motor 36 to the turret rotation controller 50 and the tool change rotary position determining unit 52.

The spindle motion controller 48 controls the spindle moving motor 34 to move the spindle head 16 in the Z-direction. When the tool change rotary position determination mode is actuated by the operator operating the input unit, the spindle motion controller 48 moves the spindle head 16 upward to swing the turret 24 until it takes the tool change state as shown in FIG. 2.

Then, with a tool 14 held by an arbitrary grip (a specific grip) 24a among the plurality of grips 24a (may be referred hereinbelow to as a specific tool 14) set at the tool change position, the spindle motion controller 48 controls the spindle moving motor 34 to move the spindle head 16 downward so that the tool holder 14a of the specific tool 14 is inserted into the attachment hole 12a of the spindle 12.

Figure 5:
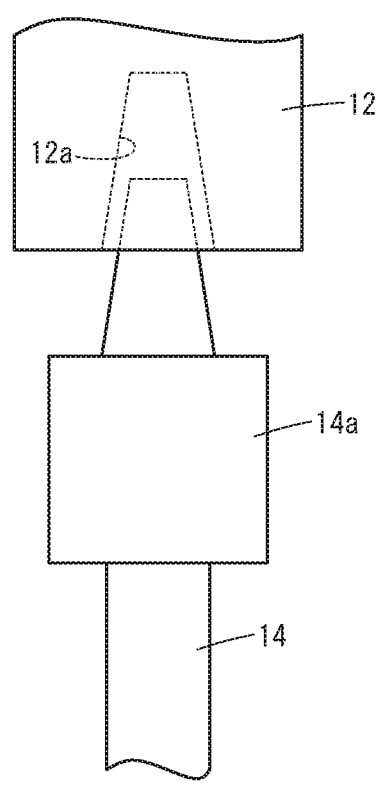
FIG. 5 is a diagram showing a state in which a tool is inserted in an attachment hole when a tool change rotary position determination mode is actuated.

At this time, the spindle motion controller 48 inserts the tool holder 14a of the specific tool 14 into the attachment hole 12a of the spindle 12 in such a manner as to create a predetermined clearance between the tool holder 14a of the specific tool 14 and the attachment hole 12a with respect to the axial direction of the spindle 12, as shown in FIG. 5. When a predetermined clearance is created, the tool 14 is still held by the grip 24a of the turret 24. The spindle motion controller 48 performs feedback control on the spindle moving motor 34 based on the rotary position taken by the rotary position acquisition unit 42.

The turret rotation controller 50 controls the turning motor 36 to rotate (turn) the turret 24 about the rotation axis O. Before the tool holder 14a of the specific tool 14 is inserted into the attachment hole 12a of the spindle 12 by the spindle motion controller 48, the turret rotation controller 50 rotates the turret 24 so that the specific tool 14 held by the specific grip 24a comes to the tool change position. This specific grip 24a is one of the multiple grips 24a on the turret 24, for which the tool change rotary position of the turret 24 needs to be determined.

Specifically, a tool change rotary position (referred to hereinbelow as the reference tool change rotary position) of the turret 24 is stored beforehand in the storage unit 54, in association with each of the multiple grips 24a. The turret rotation controller 50 rotates the turret 24 to the reference tool change rotary position corresponding to the specific grip 24a stored in the storage unit 54. As a result, the specific tool 14 held by the specific grip 24a comes to the tool change position. However, when the tools 14 attached to the turret 24 are distributed unevenly or in an imbalanced manner, a positional deviation or a positional error may occur between the specific grip 24a and the spindle 12. Alternatively, due to manufacturing error or attachment error of the turret 24, the spindle 12 or the like, a positional deviation may occur between the specific grip 24a and the spindle 12.

When the tools 14 attached to the turret 24 are distributed unevenly, the position of the center of gravity of the turret 24 having the tools 14 attached thereto deviates from the rotation axis O of the turret 24. As a result, a load torque arises and acts on the turning motor 36. Therefore, when the turret 24 is turned so that the specific tool 14 comes to the tool change position and set to the tool change state, and when the turret 24 takes the tool change state, the load torque acquisition unit 46 acquires the load torque generated on the turning motor 36 as an offset load torque. That is, the load torque arising in the turning motor 36 immediately before the tool holder 14a of the specific tool 14 is inserted into the attachment hole 12a of the spindle 12 is obtained as the offset load torque. The load torque acquisition unit 46 subtracts the offset load torque from the load torque on the turning motor 36 calculated based on the detection signal of the load torque detector 36b, and adopts the result as the load torque on the turning motor 36.

When the tool holder 14a has been inserted into the attachment hole 12a of the spindle 12 with a predetermined clearance kept between the tool holder 14a of the specific tool 14 and the attachment hole 12a with respect to the axial direction of the spindle 12, the turret rotation controller 50 controls the turning motor 36 to turn the turret 24 clockwise and counterclockwise.

For example, the turret rotation controller 50 turns the turret 24 clockwise first. When the load torque on the turning motor 36 (the load torque with the offset load torque subtracted) exceeds a predetermined value, the turret rotation controller 50 turns the turret 24 counterclockwise. As the turret 24 is turned clockwise, the tool holder 14a collides against the inner wall of the attachment hole 12a of the spindle 12, so that the load torque (the load torque with the offset load torque subtracted) on the turning motor 36 exceeds the predetermined value.

Then, when the load torque on the turning motor 36 (the load torque with the offset load torque subtracted) exceeds the predetermined value after counterclockwise rotation of the turret 24, the turret rotation controller 50 may slightly turn the turret 24 clockwise and then stop it. As the turret 24 is turned counterclockwise, the tool holder 14*a* collides against the inner wall of the attachment hole 12*a* of the spindle 12, so that the load torque (the load torque with the offset load torque subtracted) on the turning motor 36 exceeds the predetermined value. In this process, the turret rotation controller 50 performs feedback control on the turning motor 36 based on the rotary position acquired by the rotary position acquisition unit 44.

The tool change rotary position determining unit 52 determines the tool change rotary position based on the load torque (the load torque with the offset load torque subtracted) on the turning motor 36 when the turret 24 was turned clockwise and counterclockwise. The tool change rotary position determining unit 52 determines the tool change rotary position based on the rotary position of the turret 24 when the load torque exceeded the predetermined value. More specifically, the tool change rotary position determining unit 52 determines the tool change rotary position, based on the rotary position of the turret 24 (which may also be referred to hereinbelow as the first rotary position) when the turret 24 was turned clockwise and the load torque on the turning motor 36 exceeded the predetermined value, and the rotary position of the turret 24 (which may also be referred to hereinbelow as the second rotary position) when the turret 24 was turned counterclockwise and the load torque on the turning motor 36 exceeded the predetermined value. The tool change rotary position determining unit 52 determines the midpoint between the first rotary position and the second rotary position as the tool change rotary position. The tool change rotary position determining unit 52 stores the determined tool change rotary position in association with the specific grip 24*a* in the storage unit 54.

Next, the operation of the machine tool 10 will be described with reference to the flowchart in FIG. 6. When the tool change rotary position determination mode is actuated by the operator operating the input unit, the machine tool 10 executes the operation shown in FIG. 6. Here, in the operation shown in FIG. 6, it is assumed that the rotary position detectors 34*a*, 36*a* detect the rotary positions of the spindle moving motor 34 and the turning motor 36 at a predetermined cycle. It is also assumed that the rotary position acquisition units 42, 44 acquire the rotary positions of the spindle moving motor 34 and the turning motor 36 at a predetermined cycle. It is further assumed that the load torque detector 36*b* detects the load torque on the turning motor 36 at a predetermined cycle.

At step S1, the turret rotation controller 50 controls the turning motor 36 to turn the turret 24 so that the specific tool 14 held by the specific grip 24*a* comes to the tool change position. At this time, the turret rotation controller 50 reads the reference tool change rotary position corresponding to the specific grip 24*a* from the storage unit 54 and rotates the turret 24 to the read reference tool change rotary position, to thereby move the specific tool 14 held by the grip 24*a* to the tool change position.

Next, at step S2, the spindle motion controller 48 controls the spindle moving motor 34 to move the spindle 12 in the positive Z-direction and swing the turret 24 until the turret 24 is set into the tool change state. As a result, the turret 24 is set in the state shown in FIG. 2, and the specific tool 14 moved to the tool change position is positioned under the spindle 12.

Next, at step S3, the load torque acquisition unit 46 starts acquiring the load torque with the offset load torque subtracted. That is, the load torque acquisition unit 46, based on the detection signal from the load torque detector 36*b*, acquires the offset load torque and calculates the load torque with the offset load torque subtracted. The load torque acquisition unit 46 acquires the load torque at a predetermined cycle. As a result, even when the tools 14 attached on the turret 24 are arranged in an imbalanced manner, the load torques obtained by the load torque acquisition unit 46 come down to approximately zero as long as the tool holder 14*a* of the specific tool 14 and the attachment hole 12*a* of the spindle 12 do not collide with each other.

Next, at step S4, the spindle motion controller 48 controls the spindle moving motor 34 to move the spindle 12 in the negative Z-direction and insert the tool holder 14*a* of the specific tool 14 into the attachment hole 12*a* of the spindle 12 while creating a predetermined clearance between the tool holder 14*a* and the attachment hole 12*a* with respect to the axial direction of the spindle 12 (see FIG. 5).

Next, at step S5 the turret rotation controller 50 controls the turning motor 36 to turn the turret 24 clockwise.

Next, at step S6 the turret rotation controller 50 determines whether or not the load torque (the load torque with the offset load torque subtracted) acquired by the load torque acquisition unit 46 exceeds a predetermined value. If it is determined at step S6 that the load torque does not exceed the predetermined value, the control returns to step S5. If it is determined that the load torque exceeds the predetermined value, the control proceeds to step S7.

At step S7, the turret rotation controller 50 controls the turning motor 36 to turn the turret 24 counterclockwise.

Next, at step S8 the turret rotation controller 50 determines whether or not the load torque (the load torque with the offset load torque subtracted) acquired by the load torque acquisition unit 46 exceeds the predetermined value. If it is determined at step S8 that the load torque does not exceed the predetermined value, the control returns to step S7. If it is determined that the load torque exceeds the predetermined value, the control proceeds to step S9.

When it is determined at step S8 that the load torque exceeds the predetermined value, the turret rotation controller 50 may slightly rotate the turret 24 clockwise so that the tool holder 14*a* of the specific tool 14 does not come into contact with the attachment hole 12*a*.

At step S9, the tool change rotary position determining unit 52 determines the tool change rotary position, based on the rotary positions of the turret 24 when the load torque (the load torque with the offset load torque subtracted) exceeded the predetermined value. Specifically, the midpoint between the rotary position (the first rotary position) of the turret 24 when the load torque was determined to exceed the predetermined value at step S6 and the rotary position (the second rotary position) of the turret 24 when the load torque was determined to exceed the predetermined value at step S8, is determined as the tool change rotary position.

Thus, it is possible to accurately and easily determine the tool change rotary position of the turret 24 in transferring the tool 14 between the turret 24 and the spindle 12 to perform its attachment to and removal from the spindle 12. Therefore, in a case where the tools 14 are placed on the turret 24 unevenly, even if a positional deviation occurs due to manufacturing error, attachment error, etc. of the turret 24, the spindle 12 or the like, it is possible to accurately and easily determine the tool change rotary position of the turret 24 without causing misalignment between the spindle 12 and the grip 24*a*.

Next, at step S10 the tool change rotary position determining unit 52 stores the tool change rotary position determined at step S9 in association with the specific grip 24a in the storage unit 54. By using the tool change rotary position stored in the storage unit 54, it is possible to turn the turret 24 to the rotary position free from misalignment between the spindle 12 and the grip 24a from the next time onward.

Here, it may be possible to determine the tool change rotary position for each of all the grips 24a that hold tools 14 by sequentially selecting one grip 24a after another as the specific grip 24a once the tool change rotary position determination mode is actuated in the machine tool 10.

In a case where the tool change rotary position determining device 40 is a control device different from that for controlling the machine tool 10 to perform machining, the tool change rotary position determining device 40 transmits the determined tool change rotary position to the controller that controls the machine tool 10 for machining. At this time, the tool change rotary position determining device 40 transmits information on the grip 24a associated with the tool change rotary position.

VARIATIONAL EXAMPLES

The above-described embodiment can be modified as follows.

Variational Example 1

Figure 7:
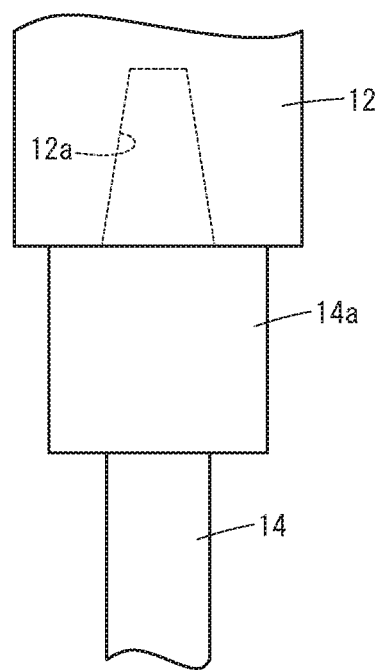
FIG. 7 is a diagram showing a state in which a tool is inserted in an attachment hole when the tool change rotary position determination mode in Variational Example 1 is in progress.

Variational Example 1 is different from the above embodiment in that the spindle motion controller 48 controls the spindle moving motor 34 to insert the tool holder 14a of the specific tool 14 into the attachment hole 12a of the spindle 12 so as not to create any clearance between the tool holder 14a of the specific tool 14 and the attachment hole 12a with respect to the axial direction of the spindle 12, as shown in FIG. 7. Even in this state, the specific tool 14 is gripped by the specific grip 24a.

Then, under the condition where the tool holder 14a of the specific tool 14 is fitted without any clearance to the attachment hole 12a with respect to the axial direction of the spindle 12, the turret rotation controller 50 controls the turning motor 36 to turn the turret 24 clockwise and counterclockwise. At this time, the turret rotation controller 50 rotates the turret 24 clockwise by a predetermined angle θ, and then rotates the turret 24 counterclockwise by 2θ, i.e., twice the predetermined angle. In other words, the turret 24 is turned by a predetermined angle θ clockwise and counterclockwise from the position where the tool holder 14a of the specific tool 14 is inserted into the attachment hole 12a.

The tool change rotary position determining unit 52 determines the rotary position of the turret 24 at which the load torque (the load torque with the offset load torque subtracted) becomes minimum while the turret 24 is turned clockwise and counterclockwise, as the tool change rotary position.

Next, the operation of the machine tool 10 in Variational Example 1 will be described with reference to the flowchart in FIG. 8. When the tool change rotary position determination mode is actuated by the operator operating the input unit, the machine tool 10 executes the operation shown in FIG. 8. During the operation of FIG. 8, it is assumed that the rotary position detectors 34a, 36a detect the rotary positions of the spindle moving motor 34 and the turning motor 36 at a predetermined cycle. It is also assumed that the rotary position acquisition units 42, 44 acquire the rotary positions of the spindle moving motor 34 and the turning motor 36 at a predetermined cycle. It is further assumed that the load torque detector 36b detects the load torque on the turning motor 36 at a predetermined cycle.

At step S11, the turret rotation controller 50 controls the turning motor 36 to turn the turret 24 so that the specific tool 14 held by the specific grip 24a comes to the tool change position. At this time, the turret rotation controller 50 reads the reference tool change rotary position corresponding to the specific grip 24a from the storage unit 54 and rotates the turret 24 to the read reference tool change rotary position, to thereby move the specific tool 14 held by the grip 24a to the tool change position.

Next, at step S12, the spindle motion controller 48 controls the spindle moving motor 34 to move the spindle 12 in the positive Z-direction and swing the turret 24 until the turret 24 is set into the tool change state. As a result, the turret 24 is set in the state shown in FIG. 2, and the specific tool 14 moved to the tool change position is positioned under the spindle 12.

Next, at step S13, the load torque acquisition unit 46 starts acquiring the load torque with the offset load torque subtracted. That is, the load torque acquisition unit 46, based on the detection signal of the load torque detector 36b, acquires the offset load torque and calculates the load torque with the offset load torque subtracted. The load torque acquisition unit 46 acquires the load torque at a predetermined cycle. As a result, even when the tools 14 attached to the turret 24 are arranged in an uneven manner, the load torques obtained by the load torque acquisition unit 46 come down to approximately zero as long as the tool holder 14a of the specific tool 14 and the attachment hole 12a of the spindle 12 do not collide with each other.

Next, at step S14, the spindle motion controller 48 controls the spindle moving motor 34 to move the spindle 12 in the negative Z-direction and insert the tool holder 14a into the attachment hole 12a of the spindle 12 so as not to create any clearance between the tool holder 14a of the specific tool 14 held by the specific grip 24a and the attachment hole 12a with respect to the axial direction of the spindle 12 (see FIG. 7).

Next, at step S15 the turret rotation controller 50 controls the turning motor 36 to turn the turret 24 clockwise by a predetermined angle θ.

Next, at step S16 the turret rotation controller 50 controls the turning motor 36 to turn the turret 24 counterclockwise by twice the predetermined angle 28.

Next, at step S17 the tool change rotary position determining unit 52, based on the load torque (the load torque with the offset load torque subtracted) acquired by the load torque acquisition unit 46 and the rotary position of the turret 24 acquired by the rotary position acquisition unit 44, determines the tool change rotary position. More specifically, the tool change rotary position determining unit 52 determines the rotary position of the turret 24 at which the load torque (the load torque with the offset load torque subtracted) became minimum when the turret 24 was turned clockwise and counterclockwise, as the tool change rotary position.

Thus, it is possible to accurately and easily determine the tool change rotary position of the turret 24 in transferring the tool 14 between the turret 24 and the spindle 12 to perform its attachment to and removal from the spindle 12. Therefore, in a case where the tools 14 are placed on the turret 24 unevenly, even if a positional deviation occurs due to manufacturing error, attachment error, etc. of the turret 24, the spindle 12 or the like, it is possible to accurately and easily determine the tool change rotary position of the turret 24 without causing misalignment between the spindle 12 and the grip 24a.

Subsequently, at step S18 the tool change rotary position determining unit 52 stores the tool change rotary position determined at step S17 in association with the specific grip 24a in the storage unit 54. By using the tool change rotary position stored in the storage unit 54, it is possible to turn the turret 24 to the rotary position free from misalignment between the spindle 12 and the grip 24a from the next time onward.

In Variational Example 1 as well, it is possible to determine the tool change rotary position for each of all the grips 24a that hold tools 14 by sequentially selecting one grip 24a after another as the specific grip 24a once the tool change rotary position determination mode is actuated in the machine tool 10.

Further, in a case where the tool change rotary position determining device 40 is a control device different from that for controlling the machine tool 10 to perform machining, the tool change rotary position determining device 40 transmits the determined tool change rotary position to the controller that controls the machine tool 10 for machining. At this time, the tool change rotary position determining device 40 transmits information on the grip 24a associated with the tool change rotary position.

In Variational Example 1, the rotary position of the turret 24 at which the load torque becomes minimum is determined as the tool change rotary position when the turret 24 is turned clockwise and counterclockwise. Therefore, the load torque acquisition unit 46 may use the torque for which the offset load torque has not been subtracted as the load torque. That is, the load torque acquisition unit 46 may adopt the torque calculated based on only the detection signal from the load torque detector 36b as the load torque.

Variational Example 2

In the above embodiment, the turret rotation controller 50 is configured to turn the turret 24 clockwise first, then turn the turret 24 counterclockwise when the load torque exceeds the predetermined value. However, as in Variational Example 1, the turret 24 may be turned clockwise by a predetermined angle θ and then turned counterclockwise by 2θ, or twice the predetermined angle.

Variational Example 3

Figure 6:
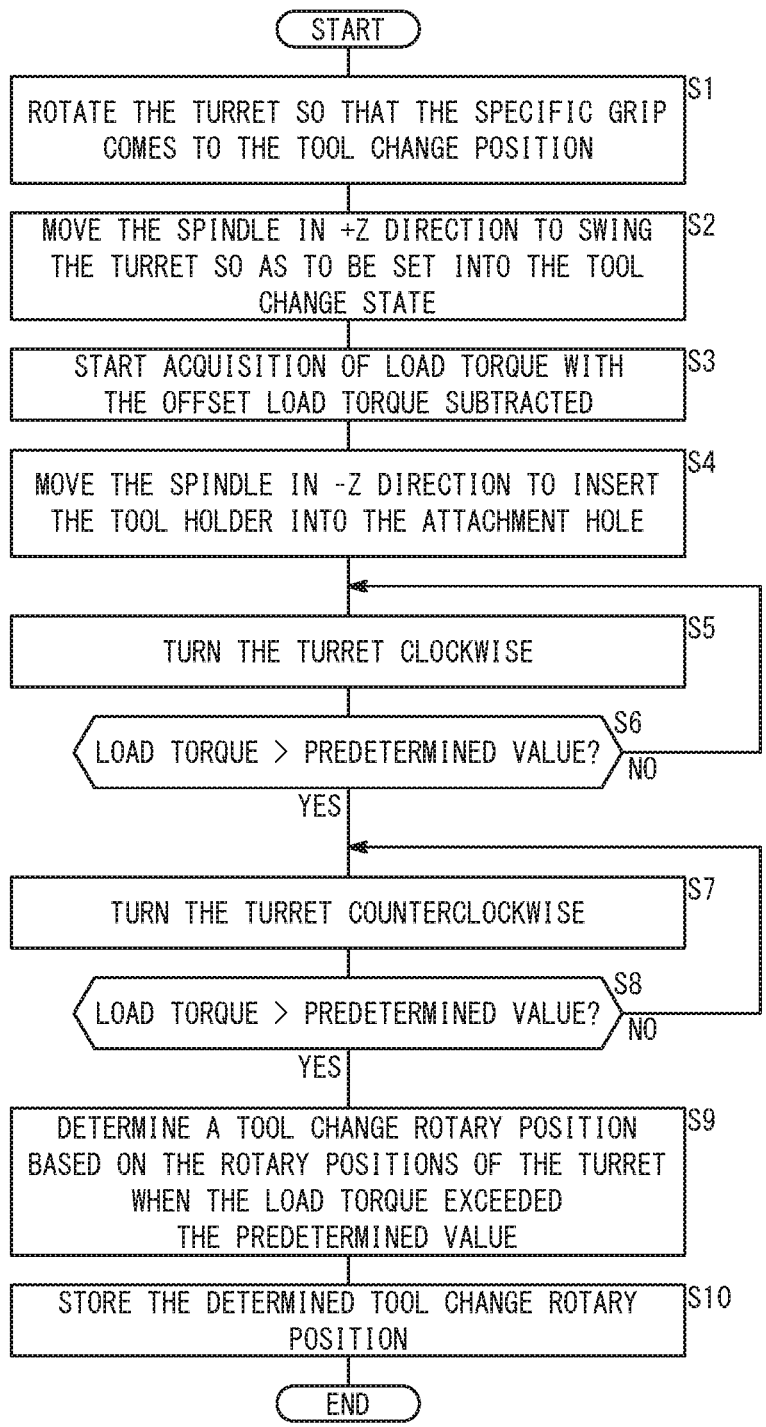
FIG. 6 is a flowchart showing the operation of a machine tool.
Figure 8:
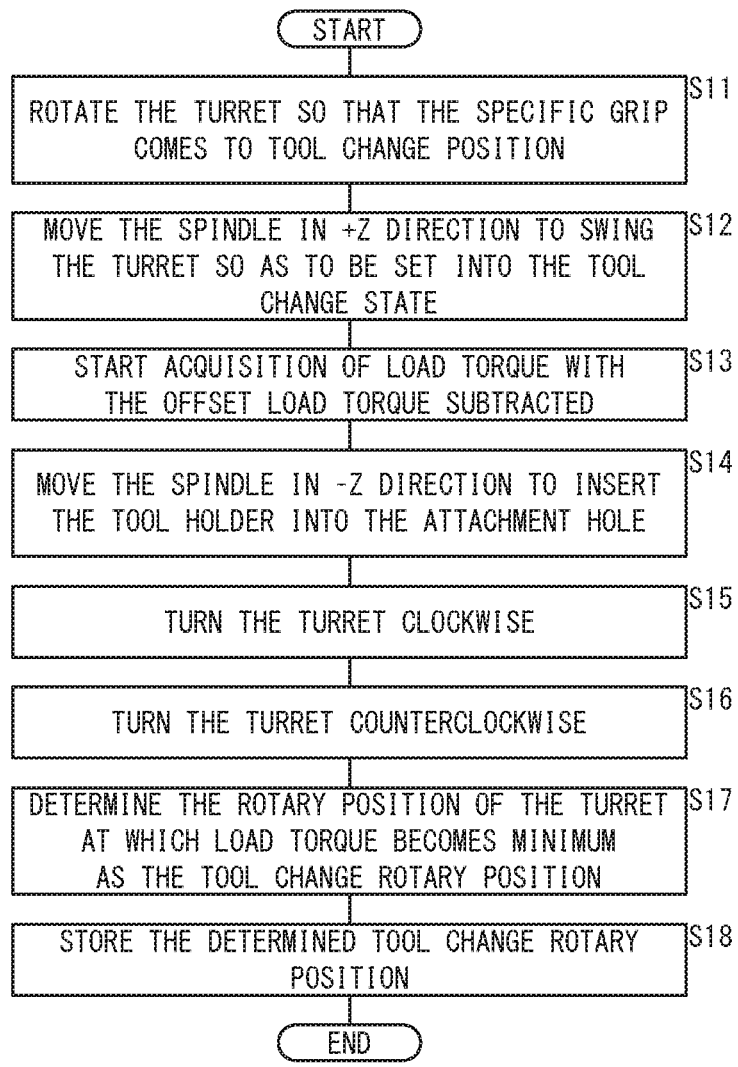
FIG. 8 is a flowchart showing the operation of a machine tool in Variational Example 1.

In the above-described embodiment and Variational Examples 1 and 2, the turret 24 is turned so that the specific tool 14 held by the specific grip 24a comes to the tool change position (step S1 in FIG. 6, step S11 in FIG. 8), then the turret 24 is moved to swing until it takes the tool change state (step S2 in FIG. 6, step S12 in FIG. 8). However, the order may be reversed. That is, the turret 24 may be moved to swing until it takes the tool change state, then the turret 24 may be turned so that the tool 14 held by the specific grip 24a comes to the tool change position.

Variational Example 4

In the above-described embodiment and Variational Examples 1 to 3, the turret rotation controller 50 rotates (turns) the turret 24 clockwise first, then rotates the turret 24 counterclockwise, but the order may be reversed.

Variational Example 5

In the above-described embodiment and Variational Examples 1 to 4, the tool change rotary position determining device 40 is configured to execute the operation illustrated in FIG. 6 or FIG. 8 when the tool change rotary position determination mode is actuated. However, but this operation may be carried out when a tool 14 is replaced to perform machining.

Variational Example 6

In the above-described embodiment and Variational Examples 1 to 5, the tool change rotary position determining device 40 may be shared by a plurality of machine tools 10 so as to determine the tool change rotary position of the turret 24 in each machine tool 10 when the tool 14 is transferred between the grip 24a and the spindle 12 to be attached to and removed from the spindle 12. In other words, the tool change rotary position determining device 40 may perform the operation shown in FIG. 6 or FIG. 8 for a plurality of machine tools 10. This enables the single device to determine the tool change rotary position for the multiple machine tools 10.

The present invention is not limited to the embodiments described above, and it goes without saying that the embodiments can be freely modified within a range that does not deviate from the essence and gist of the present invention as set forth in the appended claims.

TECHNICAL IDEAS OBTAINED FROM EMBODIMENT

Technical ideas that can be grasped from the above embodiment and Variational Examples 1 to 6 are described hereinbelow.

<First Technical Idea>

The machine tool (10), using the revolving turret (24) including the plurality of grips (24a) arranged along the circumferential direction thereof, each capable of holding the tool (14) to be attached to the attachment hole (12a) of the spindle (12) via the tool holder (14a), transfers the tool (14) between the grip (24a) and the spindle (12) to attach the tool (14) to or remove the tool (14) from the spindle (12). The machine tool (10) includes the turning motor (36) for turning the turret (24). The tool change rotary position determining device (40) determines the tool change rotary position of the turret (24) when the machine tool (10) transfers the tool (14) between the grip (24a) and the spindle (12) to attach the tool (14) to or remove the tool (14) from the spindle (12). The tool change rotary position determining device (40) includes: the load torque acquisition unit (46) configured to acquire the load torque on the turning motor (36); the rotary position acquisition unit (44) configured to acquire the rotary position of the turning motor (36); the turret rotation controller (50) configured to control the turning motor (36) so as to turn the turret (24) clockwise and counterclockwise in a state where the tool holder (14a) of the tool (14) gripped by the specific grip (24a) among the plurality of grips (24a) is inserted in the attachment hole (12a) of the spindle (12); and the tool change rotary position determining unit (52) configured to determine the tool change rotary position of the turret (24) when the tool (14) is transferred between the specific grip (24a) and the spindle (12) to be attached to and removed from the spindle (12), based on the load torques acquired by the load torque acquisition unit (46) and the rotary positions acquired by the rotary position acquisition unit (44) when the turret (24) is turned clockwise and counterclockwise.

This configuration makes it possible to accurately and easily determine the tool change rotary position of the turret

(24) when the tool (14) is transferred between the turret (24) and the spindle (12) to be attached to and removed from the spindle (12). Therefore, when the tools (14) are placed unevenly on the turret (24), even if a positional deviation occurs due to manufacturing error or mounting error etc. of the turret (24), the spindle (12) or the like, it is possible to accurately and easily determine the tool change rotary position of the turret (24) without causing misalignment between the spindle (12) and the grip (24a).

The turret rotation controller (50) may be configured to rotate the turret (24) clockwise and counterclockwise in a state where a predetermined clearance is provided between the tool holder (14a) and the attachment hole (12a) with respect to the axial direction of the spindle (12). The tool change rotary position determining unit (52) may be configured to determine the tool change rotary position, based on a first rotary position of the turret (24) when the load torque on the turning motor (36) exceeds a predetermined value in a state where the turret (24) is turned clockwise and a second rotary position of the turret (24) when the load torque on the turning motor (36) exceeds the predetermined value in a state where the turret (24) is turned counterclockwise. This makes it possible to accurately and easily determine the tool change rotary position of the turret (24) when the tool (14) is transferred between the turret (24) and the spindle (12) to be attached to and removed from the spindle (12).

The tool change rotary position determining unit (52) may be configured to determine the midpoint between the first rotary position and the second rotary position as the tool change rotary position. This makes it possible to accurately and easily determine the tool change rotary position of the turret (24) when the tool (14) is transferred between the turret (24) and the spindle (12) to be attached to and removed from the spindle (12).

The turret rotation controller (50) may be configured to rotate the turret (24) clockwise and counterclockwise in a state where no clearance is provided between the tool holder (14a) and the attachment hole (12a) with respect to the axial direction of the spindle (12). The tool change rotary position determining unit (52) may be configured to determine the rotary position of the turret (24) at which the load torque on the turning motor (36) becomes minimum while the turret (24) is turned clockwise and counterclockwise, as the tool change rotary position. This configuration makes it possible to accurately and easily determine the tool change rotary position of the turret (24) when the tool (14) is transferred between the turret (24) and the spindle (12) to be attached to and removed from the spindle (12).

The tool change rotary position determining device (40) may further include a storage unit (54) configured to store the tool change rotary position determined by the tool change rotary position determining unit (52) in association with the specific grip (24a). Thus, use of the tool change rotary position stored in the storage unit (54) makes it possible to turn the turret (24) to the rotary position free from misalignment between the spindle (12) and the grip (24a) from the next time onward.

The load torque acquired by the load torque acquisition unit (46) may be the load torque that is calculated by subtracting an offset load torque arising in the turning motor immediately before the tool holder (14a) of the tool (14) gripped by the specific holder (24a) is inserted into the attachment hole (12a) of the spindle (12). This configuration makes it possible to accurately and easily determine the tool change rotary position of the turret (24) when the tool (14) is transferred between the turret (24) and the spindle (12) to be attached to and removed from the spindle (12).

The tool change rotary position determining device (40) may be a different controller from that for controlling the machine tool (10) to perform machining.

The tool change rotary position determining device (40) may be configured to determine the tool change rotary position of the turret (24) in each of the plurality of the machine tools (10) when the tool (14) is transferred between the grip (24a) and the spindle (12) to be attached to and removed from the spindle (12). Thus, it is possible to determine the tool change rotary position of the plurality of machine tools (10) with the single device.

<Second Technical Idea>

The machine tool (10), using a revolving turret (24) including a plurality of grips (24a) arranged along the circumferential direction thereof, each capable of holding a tool (14) to be attached to an attachment hole (12a) of a spindle (12) via a tool holder (14a), transfers the tool (14) between the grip (24a) and the spindle (12) to attach the tool (14) to or remove the tool (14) from the spindle (12). The machine tool (10) includes a turning motor (36) for turning the turret (24). The tool change rotary position determining method determines the tool change rotary position of the turret (24) when the machine tool (10) transfers the tool (14) between the grip (24a) and the spindle (12) to attach the tool (14) to or remove the tool (14) from the spindle (12). The tool change rotary position determining method includes: a load torque acquiring step of acquiring the load torque on the turning motor (36); a rotary position acquiring step of acquiring the rotary position of the turning motor (36); a turret rotation controlling step of controlling the turning motor (36) so as to turn the turret (24) clockwise and counterclockwise in a state where the tool holder (14a) of the tool (14) gripped by a specific grip (24a) among the plurality of grips (24a) is inserted in the attachment hole (12a) of the spindle (12); and a tool change rotary position determining step of determining a tool change rotary position of the turret (24) when the tool (14) is transferred between the specific grip (24a) and the spindle (12) to be attached to and removed from the spindle (12), based on the load torques acquired at the load torque acquiring step and the rotary positions acquired at the rotary position acquiring step when the turret (24) is turned clockwise and counterclockwise.

This configuration makes it possible to accurately and easily determine the tool change rotary position of the turret (24) when the tool (14) is transferred between the turret (24) and the spindle (12) to be attached to and removed from the spindle (12). Therefore, when the tools (14) are placed unevenly on the turret (24), even if a positional deviation occurs due to manufacturing error or mounting error etc. of the turret (24), the spindle (12) or the like, it is possible to accurately and easily determine the tool change rotary position of the turret (24) without causing misalignment between the spindle (12) and the grip (24a).

The turret rotation controlling step may rotate the turret (24) clockwise and counterclockwise in a state where a predetermined clearance is provided between the tool holder (14a) and the attachment hole (12a) with respect to the axial direction of the spindle (12). The tool change rotary position determining step may determine the tool change rotary position, based on a first rotary position of the turret (24) when the load torque on the turning motor (36) exceeds a predetermined value in a state where the turret (24) is turned clockwise and a second rotary position of the turret (24) when the load torque on the turning motor (36) exceeds the predetermined value in a state where the turret (24) is turned counterclockwise. This makes it possible to accurately and easily determine the tool change rotary position of the turret (24) when the tool (14) is transferred between the turret (24) and the spindle (12) to be attached to and removed from the spindle (12).

The tool change rotary position determining step may determine the midpoint between the first rotary position and the second rotary position as the tool change rotary position. This makes it possible to accurately and easily determine the tool change rotary position of the turret (24) when the tool (14) is transferred between the turret (24) and the spindle (12) to be attached to and removed from the spindle (12).

The turret rotation controlling step may rotate the turret (24) clockwise and counterclockwise in a state where no clearance is provided between the tool holder (14a) and the attachment hole (12a) with respect to the axial direction of the spindle (12). The tool change rotary position determining step may determine the rotary position of the turret (24) at which the load torque on the turning motor (36) becomes minimum while the turret (24) is turned clockwise and counterclockwise, as the tool change rotary position. This makes it possible to accurately and easily determine the tool change rotary position of the turret (24) when the tool (14) is transferred between the turret (24) and the spindle (12) to be attached to and removed from the spindle (12).

The tool change rotary position determining method may further include a storing step of storing the tool change rotary position determined at the tool change rotary position determining step in a storage unit (54) in association with the specific grip (24a). Thus, use of the tool change rotary position stored in the storage unit (54) makes it possible to turn the turret (24) to the rotary position free from misalignment between the spindle (12) and the grip (24a) from the next time onward.

The load torque acquired at the load torque acquiring step may be the load torque that is calculated by subtracting an offset load torque arising in the turning motor immediately before the tool holder (14a) of the tool (14) gripped by the specific holder (24a) is inserted into the attachment hole (12a) of the spindle (12), from the load torque actually acting on the turning motor (36). This configuration makes it possible to accurately and easily determine the tool change rotary position of the turret (24) when the tool (14) is transferred between the turret (24) and the spindle (12) to be attached to and removed from the spindle (12).

The tool change rotary position determining method may be effected by a different controller from that for controlling the machine tool (10) to perform machining.

The tool change rotary position determining method may determine the tool change rotary position of the turret (24) in each of the plurality of the machine tools (10) when the tool (14) is transferred between the grip (24a) and the spindle (12) to be attached to and removed from the spindle (12). It is possible to determine the tool change rotary position of the multiple machine tools (10).

What is claimed is:

1. A tool change rotary position determining device for use with a machine tool, the machine tool comprising: a revolving turret including a plurality of grips arranged along a circumferential direction thereof, each of the plurality of grips capable of holding a tool to be attached to an attachment hole of a spindle via a tool holder; and a turning motor configured to turn the turret, the tool change rotary position determining device determining a tool change rotary position of the turret when the machine tool transfers the tool between a specific grip of the plurality of grips and the spindle so as to attach the tool to or remove the tool from the spindle, the tool change rotary position determining device comprising:
   a processor programmed to:
      acquire a load torque on the turning motor from a load torque detector coupled to the turning motor;
      acquire a rotary position of the turning motor from a rotary position detector coupled to the turning motor;
      control the turning motor so as to turn the turret clockwise and counterclockwise in a state where the tool holder of the tool gripped by the specific grip of the plurality of grips is inserted in the attachment hole of the spindle; and
      determine the tool change rotary position of the turret when the tool is transferred between the specific grip and the spindle based on the load torque acquired by the load torque detector and the rotary position acquired by the rotary position detector when the turret is turned clockwise and counterclockwise;
   wherein the load torque acquired is the load torque that is calculated by subtracting an offset load torque arising in the turning motor before the tool holder of the tool gripped by the specific grip is inserted into the attachment hole of the spindle.

2. The tool change rotary position determining device according to claim 1, wherein the processor is further programmed to:
   rotate the turret clockwise and counterclockwise in a state where a predetermined clearance is provided between the tool holder and the attachment hole with respect to an axial direction of the spindle; and
   determine the tool change rotary position, based on a first rotary position of the turret when the load torque on the turning motor exceeds a predetermined value in a state where the turret is turned clockwise and a second rotary position of the turret when the load torque on the turning motor exceeds the predetermined value in a state where the turret is turned counterclockwise.

3. The tool change rotary position determining device according to claim 2, wherein the processor is further programmed to determine a midpoint between the first rotary position and the second rotary position as the tool change rotary position.

4. The tool change rotary position determining device according to claim 1, wherein the processor is further programmed to:
   rotate the turret clockwise and counterclockwise in a state where no clearance is provided between the tool holder and the attachment hole with respect to an axial direction of the spindle; and
   determine the rotary position of the turret at which the load torque on the turning motor becomes minimum while the turret is turned clockwise and counterclockwise, as the tool change rotary position.

5. The tool change rotary position determining device according to claim 1, further comprising a storage unit configured to store the determined tool change rotary position.

6. The tool change rotary position determining device according to claim 1, wherein the processor programmed to determine the tool change rotary position is not part of a controller for controlling the machine tool to perform machining.

7. The tool change rotary position determining device according to claim 1, wherein the processor is further programmed to:

determine the tool change rotary position of the turret in each of a plurality of the machine tools when the tool is transferred between the specific grip and the spindle so as to attach the tool to or remove the tool from the spindle.

\* \* \* \* \*